(12) United States Patent
Nakano et al.

(10) Patent No.: US 7,078,893 B2
(45) Date of Patent: Jul. 18, 2006

(54) ROTATION ANGLE DETECTING DEVICE

(75) Inventors: Yuji Nakano, Toyota (JP); Ryo Sano, Kariya (JP); Akira Furukawa, Kariya (JP); Shinji Ishida, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/289,647

(22) Filed: Nov. 30, 2005

(65) Prior Publication Data

US 2006/0119353 A1 Jun. 8, 2006

(51) Int. Cl.
*G01B 7/30* (2006.01)

(52) U.S. Cl. .................. 324/207.25; 324/244

(58) Field of Classification Search .......... 324/207.25, 324/244

See application file for complete search history.

(56) References Cited

U.S. PATENT DOCUMENTS

| | | | |
|---|---|---|---|
| 5,164,668 A | 11/1992 | Alfors | |
| 5,670,875 A * | 9/1997 | Alfors et al. | ............... 324/202 |
| 5,694,039 A | 12/1997 | Alfors | |
| 6,232,771 B1 * | 5/2001 | Herden et al. | ......... 324/207.25 |
| 6,593,734 B1 * | 7/2003 | Gandel et al. | ......... 324/207.25 |
| 6,703,827 B1 * | 3/2004 | Wolf et al. | ............ 324/207.12 |
| 6,707,292 B1 | 3/2004 | Viola | |
| 2004/0251893 A1 * | 12/2004 | Takahara | ................. 324/207.2 |

* cited by examiner

Primary Examiner—Bot LeDynh
(74) Attorney, Agent, or Firm—Nixon & Vanderhye P.C.

(57) ABSTRACT

A rotation angle detecting device includes a magnet (4), a magnetic substance unit (5), and a non-contact magnetic detection element (7). The magnet (4) rotates with an object to be measured and includes two ends magnetized so as to have opposite polarities. The magnetic substance unit (5) forms a predetermined air gap with the two ends of the magnet (4) and is divided into magnetic members (6) so as to provide plane symmetry with respect to a vertical plane perpendicularly crossing a rotational center axis of the magnet (4) to form a magnetic detection gap (9) by the division. The non-contact magnetic detection element (7) is provided in the magnetic detection gap (9) between the magnetic members (6) so as to output a signal corresponding to a density of a magnetic flux passing through the magnetic detection gap (9). The rotation angle of the object to be measured is detected based on the output signal from the magnetic detection element (7). The magnetic members (6) include reverse warp parts (34) so that the air gap suddenly increases when the magnet (4) rotates at a predetermined rotation angle from a state where the air gap is minimum in a direction in which the air gap increases.

6 Claims, 8 Drawing Sheets

ROTATION ANGLE DETECTING DEVICE

BACKGROUND OF THE INVENTION

1. Field of the Invention

The present invention relates to a rotation angle detecting device for detecting a rotation angle of an object to be measured and, more particularly, to a throttle opening detecting device for detecting a rotation angle of a throttle valve for regulating the amount of intake air sucked into a cylinder of an internal combustion engine.

2. Description of the Related Art

Figure 8A:
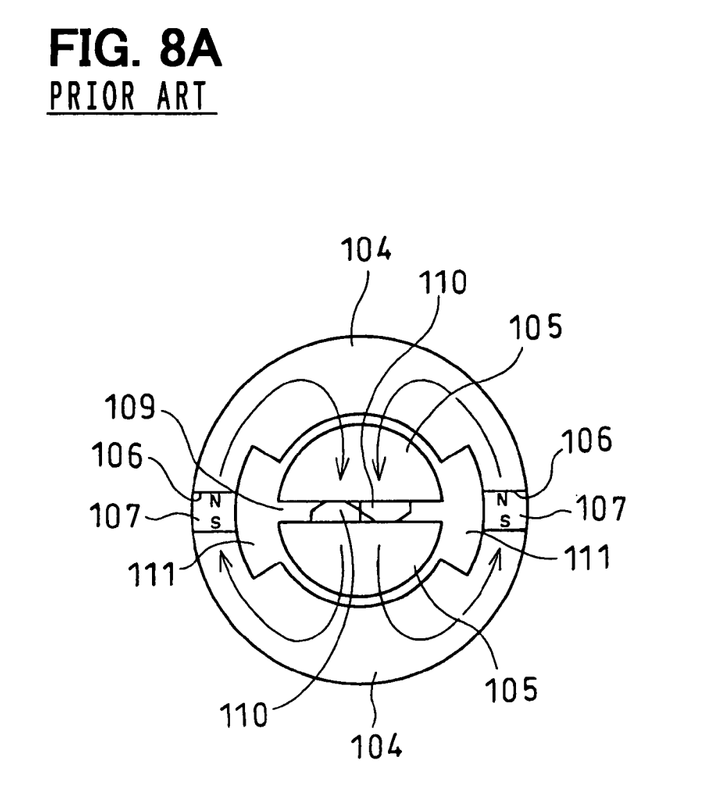
FIG. 8A is a plan view of a conventional throttle opening sensor.
Figure 8B:
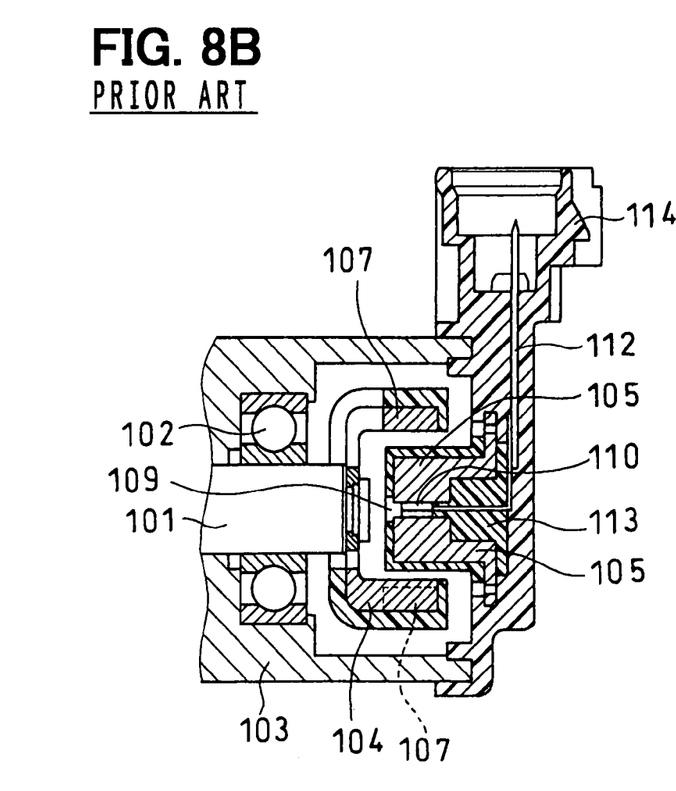
FIG. 8B is a cross-sectional view of the throttle opening sensor of FIG. 8B.

Conventionally, as a rotation angle detecting device for detecting a rotation angle of an object to be measured, for example, a throttle opening sensor (also referred to as a throttle position sensor) for detecting the degree of opening of a throttle valve (throttle opening) of an internal combustion engine has been proposed. One such example is disclosed in Japanese Patent document JP 2001-317909 A. This is, as shown in FIGS. 8A and 8B, such that a rotating shaft 101 of an object to be measured such as a throttle valve (not shown) is rotatably supported by a housing 103 through a bearing 102. A cylindrical rotor core (corresponding to a yoke) 104 is fixed to one of the ends of the rotating shaft 101. On an inner circumferential side of the rotor core 104, a columnar stator core 105 is coaxially arranged. A magnet 107 is fitted into each of two notches 106 in the rotor core 104 so as to be fixed thereto. Each of the two magnets 107 is formed to have a planar or columnar shape. On both end faces thereof, an N-pole and an S-pole are magnetized in parallel. An inner circumferential face of the rotor core 104 is opposed to an outer circumferential face of the stator core 105 through a small air gap therebetween except for the vicinity of each of the magnets 107. On the other hand, a magnetic detection gap 109 having a constant width for forming a parallel magnetic field is formed in the middle of the stator core 105 so as to penetrate therethrough in a diameter direction. Two Hall ICs 110 are horizontally arranged in the magnetic detection gap 109.

Since the two magnets 107 are arranged at the opposed positions in the diameter direction of the rotor core 104 so as to repel each other in the throttle opening sensor configured as described above, magnetic flux generated from the N-pole of each of the magnets 107 passes through a magnetic path from the rotor core 104, the stator core 105, the magnetic detection gap 109 (the Hall ICs 110), the stator core 105 to the rotor core 104 so as to return to the S-pole of each of the magnets 107. When the rotor core 104 rotates with the rotation of the object to be measured such as the throttle valve, a density of magnetic flux passing through the magnetic detection gap 109 in the stator core 105 (a magnetic flux density crossing the Hall ICs 110) varies in accordance with its rotation angle. In accordance with the magnetic flux density, an output voltage from the Hall ICs 110 varies. In the throttle opening sensor shown in FIG. 8A a relatively large air gap 111 is formed in the vicinity of each of the magnets 107 on the inner circumferential side of the rotor core 104. As a result, short-circuit of the magnetic flux between both poles of each of the magnets 107 and the stator core 105 can be prevented by the air gap 111, thereby preventing the density of the magnetic flux passing through the magnetic detection gap 109 (the Hall ICs 110) from being lowered.

Figure 6A:
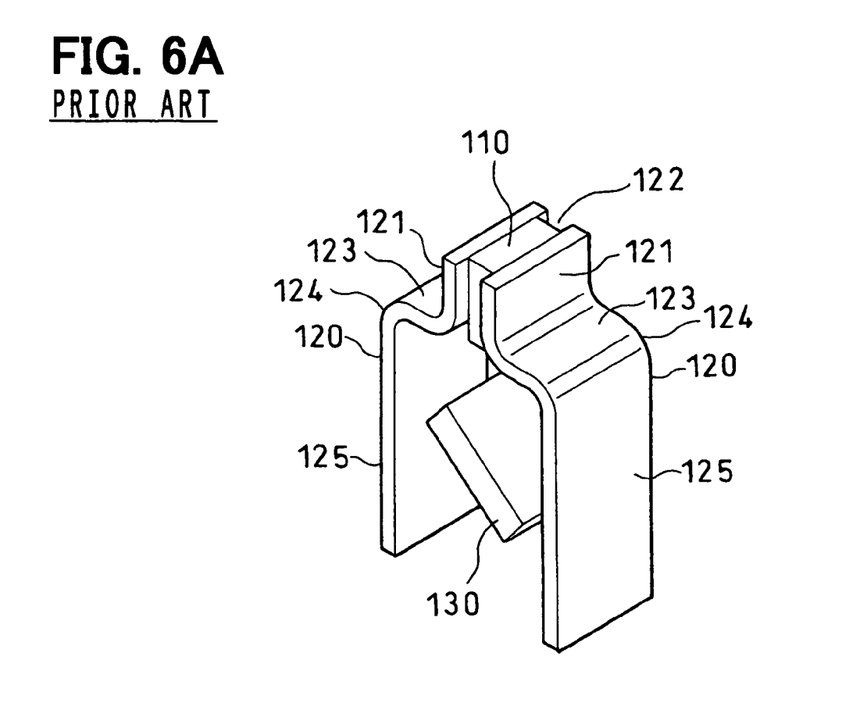
FIG. 6A is a perspective view showing a conventional throttle opening sensor.
Figure 6B:
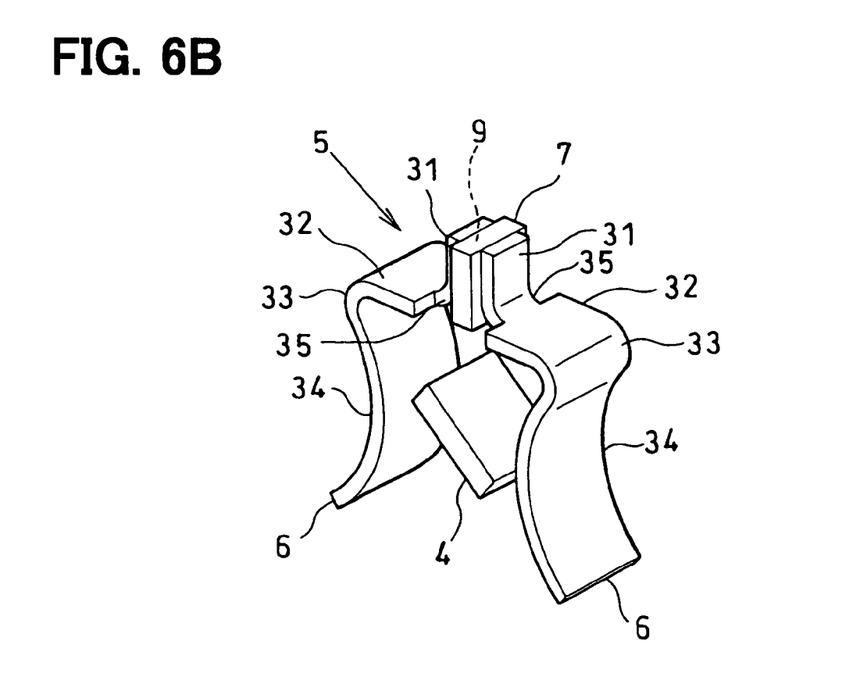
FIG. 6B is a perspective view of the first embodiment of the throttle opening sensor.
Figure 9:
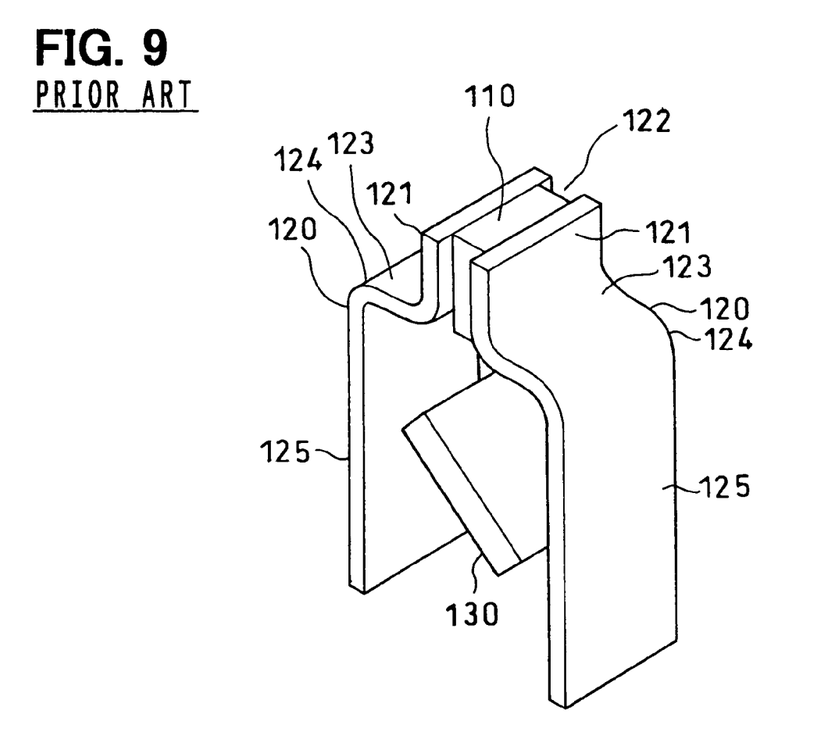
FIG. 9 is a perspective view showing the arrangement of a stator core, a Hall IC, and a magnet according to the conventional throttle opening sensor.

Moreover, as shown in FIGS. 6A and 9, a rotation angle sensor retaining the Hall IC 110 in a magnetic detection gap 122 formed between retaining pieces 121 of divided-type stator cores 120 has been proposed in U.S. Pat. No. 6,707,292 B2. When a rectangular parallelepiped magnet 130 rotates with the rotation of an object to be measured, a density of magnetic flux passing through the magnetic detection gap 122 (a density of magnetic flux crossing the Hall IC 110) changes in accordance with its rotation angle. In accordance with the density of the magnetic flux, an output voltage of the Hall IC 110 changes. Each of the stator cores 120 includes a shoulder part 123 extended from a lower end of the retaining piece 121 in the drawing to a horizontal direction in the drawing; a bent part 124 obtained by bending at an end of the shoulder part 123; and an extended part 125 extended from an end of the bent part 124 in a straight manner to the lower end in the drawing.

In the throttle opening sensor described in Japanese Patent document JP 2001-317909 A, however, and as shown in FIGS. 8A and 8B, the Hall ICs 110 are held in a connector housing 114 obtained by resin molding of a terminal 112, to which lead wirings of the Hall ICs 110 are connected, the stator core 105, the spacer 113 and the like. Specifically, since the housing 103 for rotatably retaining the rotor core 104 and the two magnets 107 and the connector housing 114 for retaining the stator core 105 and the Hall ICs 110 are constituted by separate components, the positional accuracy (combination accuracy) of the stator core 105 and the Hall ICs 110 with respect to a magnetization direction of the two magnets 107 can hardly be obtained. Therefore, a variation in output from the Hall ICs 110 is likely to occur. As a result, there arises a problem that detection accuracy of the rotation angle of the magnets 107 rotating with the rotation of the object to be measured is lowered. Moreover, since two magnets 107 are provided as magnetic field sources, the number of components and the number of assembly steps are increased, resulting in a problem of increased cost.

Figure 10:
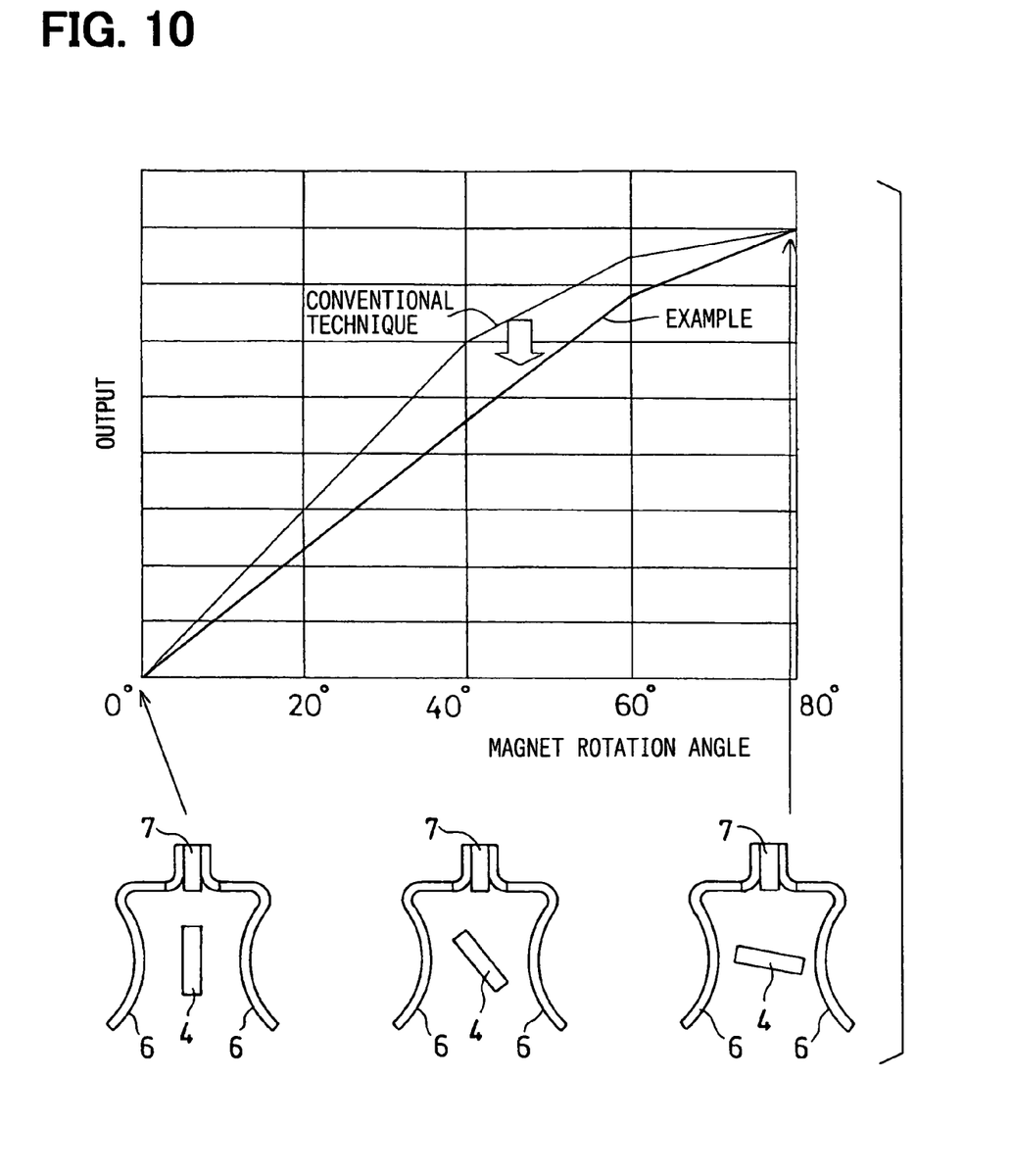
FIG. 10 is a graph showing an output characteristic of the Hall IC with respect to an angle (position) of a magnet.

Moreover, in the rotation angle sensor described in U.S. Pat. No. 6,707,292 B2, and as shown in FIGS. 6A and 9, while the rotation angle of the magnet 130 changes from the minimum angle (for example, 0°) to the vicinity of the maximum angle (for example, 80°), an output from the Hall IC 110 changes in accordance with a change in density of the magnetic flux passing through the magnetic detection gap 122. Each of the stator cores 120 includes the straight extended part 125 forming an air gap with both end faces of the magnet 130 when the magnet 130 rotates at a large rotation angle. Therefore, an output with a convex profile having an inflection point in the vicinity of the maximum angle is generated, rather than an ideal output, as indicated with a solid line in a graph of FIG. 10 presented herein according to the present invention. More specifically, a difference between the output from the Hall IC 110 and the ideal output becomes the largest when the rotation angle of the magnet 130 is in the vicinity of 45°. As a result, there arises a problem that linearity of the output value of the Hall IC 110 with respect to the rotation angle of the magnet 130, which rotates with the rotation of the object to be measured, is degraded within the range of the detected angle of the object to be measured.

SUMMARY OF THE INVENTION

An object of the present invention is to provide a rotation angle detecting device capable of improving detection accuracy of a rotation angle of an object to be measured by improving linearity of an output signal from a magnetic detection element with respect to rotation angles of the object to be measured and a magnet over a full range of a detected angle of the object to be measured. Moreover, an object of the present invention is to provide a rotation angle detecting device capable of preventing the detection accuracy of the rotation angle of the magnet rotating with the rotation of the object to be measured from being lowered by constituting a housing for rotatably holding the magnet therein and a housing for retaining magnetic members and the magnetic detection element therein by a single component.

According to one aspect of the present invention, a magnetic substance unit is divided so as to provide plane symmetry with respect to a vertical plane approximately perpendicularly crossing a rotational center axis of a magnet, and a magnetic detection element is placed in a magnetic detection gap formed by the division. A reverse warp part is provided for each of the magnetic members so that an air gap suddenly increases if the magnet rotates at a predetermined rotation angle from a state where the air gap is minimum in a direction in which the air gap increases. As a result, with the rotation of an object to be measured at a predetermined rotation angle in the direction in which the air gap increases, the air gap formed between both ends of the magnet in the magnetization direction and the inner faces (the opposed surfaces) of the magnetic members in a plate-thickness direction suddenly increases. Therefore, a density of magnetic flux passing through the magnetic detection gap between the magnetic members, that is, a density of magnetic flux crossing the magnetic detection element suddenly decreases.

As a result, since an output signal from the magnetic detection element is also suddenly lowered, the output signal approaches an ideal output signal as compared with that in the conventional techniques. Therefore, linearity of the output signal from the magnetic detection element (linearity of an output variation characteristic of the magnetic detection element) with respect to rotation angles of the object to be measured and the magnet over a full range of the detected angle of the object to be measured can be improved. In particular, since the linearity of the output signal from the magnetic detection element (the linearity of the output variation characteristic of the magnetic detection element) with respect to the rotation angle of the magnet in an area where the air gap is relatively small can be improved, the detection accuracy of the rotation angle of the object to be measured can be improved.

According to another aspect of the present invention, in the case where the positions with the minimum air gap are set as reference positions, the reverse warp parts of the magnetic members are characterized by being provided so that parts extended from the reference positions toward both sides are curved in an approximately circular manner so as to be separated away from each other.

According to still another aspect of the present invention, by providing a sensor retaining section for retaining a rotation angle sensor including magnetic members and a magnetic detection element, and a magnet holding hole for rotatably holding a magnet therein for a housing integrally formed of a non-magnetic material, a housing for rotatably holding the magnet therein and a housing for retaining the magnetic members and the magnet detection element therein can be constituted by a single component. As a result, the positional accuracy (combination accuracy) of the magnetic members and the magnetic detection element with respect to the magnetization direction of the magnet can be easily obtained, thereby reducing a variation in assembly of the magnet and the magnetic members and the magnetic detection element. Moreover, since a variation is hardly generated in output from the magnetic detection element, the detection accuracy of the rotation angle of the magnet rotating with the rotation of the object to be measured can be prevented from being lowered. Moreover, since a single magnet is provided as a magnetic field source, the number of components and the number of assembly steps can be reduced as compared with those in the conventional techniques requiring two magnets. As a result, the overall cost of the rotation angle detecting device can be reduced.

According to still another aspect of the present invention, the magnetic detection gap between the magnetic members is provided in the middle of the magnetic circuit including the magnet and the magnetic members so that a positional relation is such that a density of magnetic flux crossing both magnetically sensitive faces of the magnetic detection element in the plate-thickness direction becomes relatively small with respect to a magnetization direction of the magnet when the rotation angle of the object to be measured is positioned in the vicinity of the middle angle within the range of use. As a result, if the object to be measured is positioned in the vicinity of the middle angle within the range of use, the density of the magnetic flux passing through the magnetic detection gap between the magnetic members, that is, the density of the magnetic flux crossing both magnetically sensitive faces of the magnetic detection element in the plate-thickness direction becomes relatively small. Therefore, an output signal from the magnetic detection element has a relatively small value, thereby detecting the rotation angle of the object to be measured in the vicinity of the middle angle. Then, if the magnet rotates in both directions from the vicinity of the middle angle, the output from the magnetic detection element elevates or drops so as to accurately detect the rotation angle of the object to be measured over a wide range.

According to yet another aspect of the present invention, magnetic detection element retaining pieces, each having a smaller width than that of the reverse warp parts for concentrating the magnetic flux of the magnet thereon, are provided for the magnetic members, respectively. Then, if the respective magnetic detection element retaining pieces of the magnetic members are provided so as to be opposed to each other through the magnetic detection gap while being in contact with both magnetically sensitive faces of the magnetic detection element in the plate-thickness direction, the magnetic flux can be concentrated on both magnetically sensitive faces of the magnetic detection element in the plate-thickness direction. As a result, the magnetic flux can be concentrated on both magnetically sensitive faces of the magnetic detection element in the plate-thickness direction efficiently over the range of the rotation angle in which the magnet rotates from the minimum angle to the maximum angle with the rotation of the object to be measured, that is, over a full range of the detected angle of the object to be measured. Therefore, a stable output signal can be obtained from the magnetic detection element.

According to yet another aspect of the present invention, shoulder parts extended in an approximately straight manner in a direction approximately perpendicularly crossing a center axis direction so as to be separated away from each other are provided for the magnetic members, respectively. Then, through bent parts bent at an approximately acute angle at ends of the shoulder parts, the ends of the shoulder parts and the ends of the reverse warp parts are connected to each other. The respective magnetic detection element retaining pieces of the magnetic members are provided so as to be bent at an approximately right angle at the ends of the shoulder parts on the magnetic detection gap side so as to be separated away from the magnet. As a result, the magnetic flux can be concentrated on both magnetically sensitive faces of the magnetic detection element in the plate-thickness direction efficiently over the range of a rotation angle in which the magnet rotates from the minimum angle to the maximum angle with the rotation of the object to be measured, that is, a full range of the detected angle of the object to be measured. Therefore, a stable output signal can be obtained from the magnetic detection element.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

In the best mode for carrying out the present invention, the object of improving the detection accuracy of a rotation angle of an object to be measured is realized by improving the linearity of an output signal from a magnetic detection element with respect to a rotation angle of a magnet over a full range of a detected angle of the object to be measured. Moreover, the object of preventing the detection accuracy of the rotation angle of the magnet rotating with the rotation of the object to be measured from being lowered is realized by constituting a housing for holding the magnet rotatably therein and a housing for retaining the magnet detection element therein by a single component.

Figure 1:
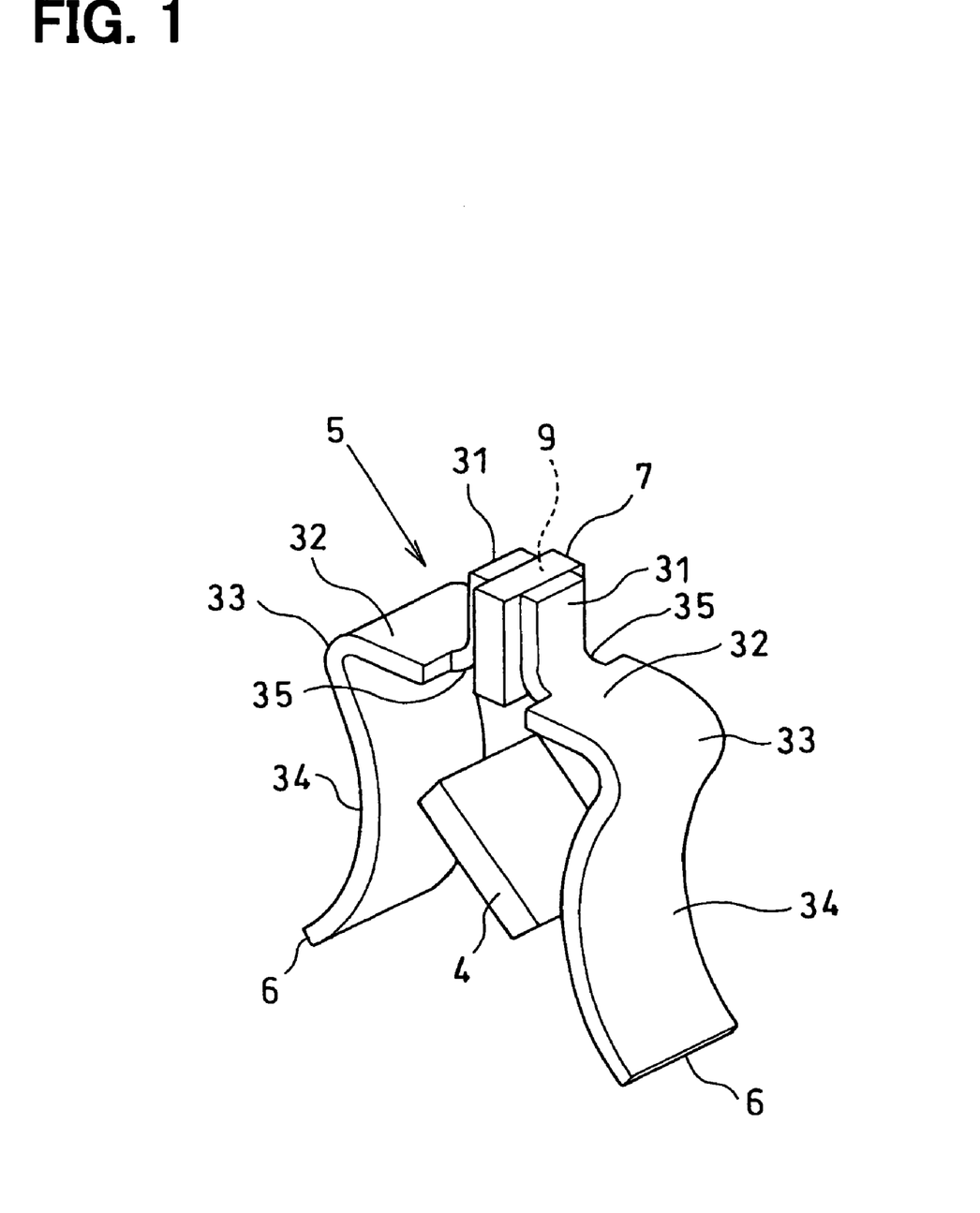
FIG. 1 is a perspective view showing a throttle opening sensor of a first embodiment of the present invention.
Figure 2A:
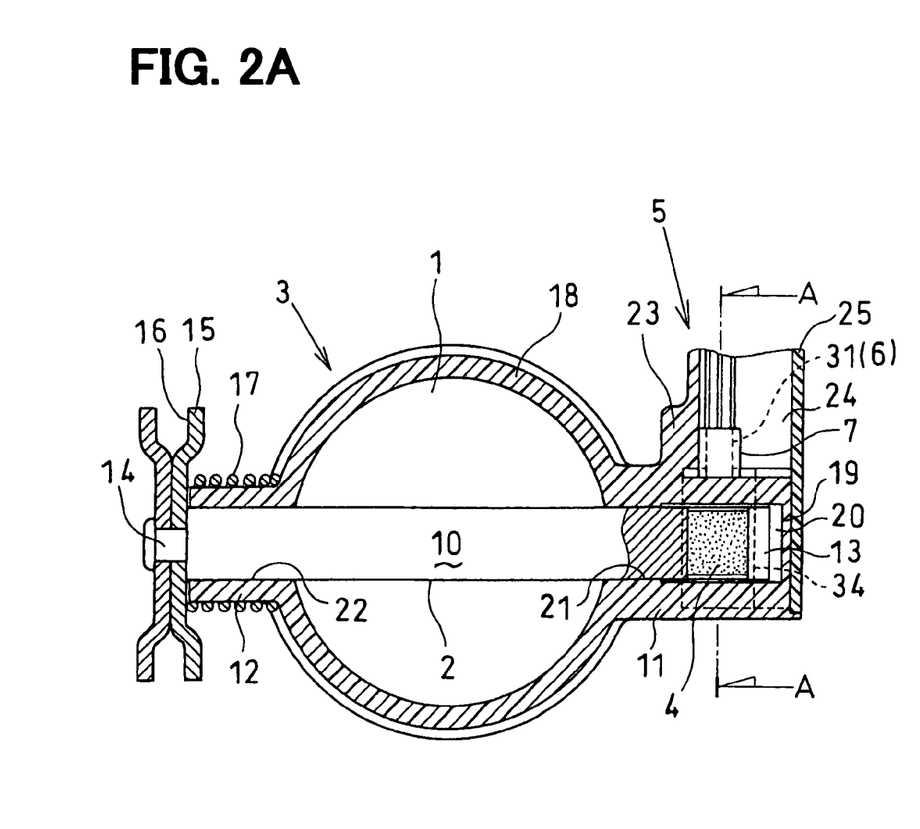
FIG. 2A is a cross-sectional view showing an intake throttle device for an internal combustion engine.
Figure 2B:
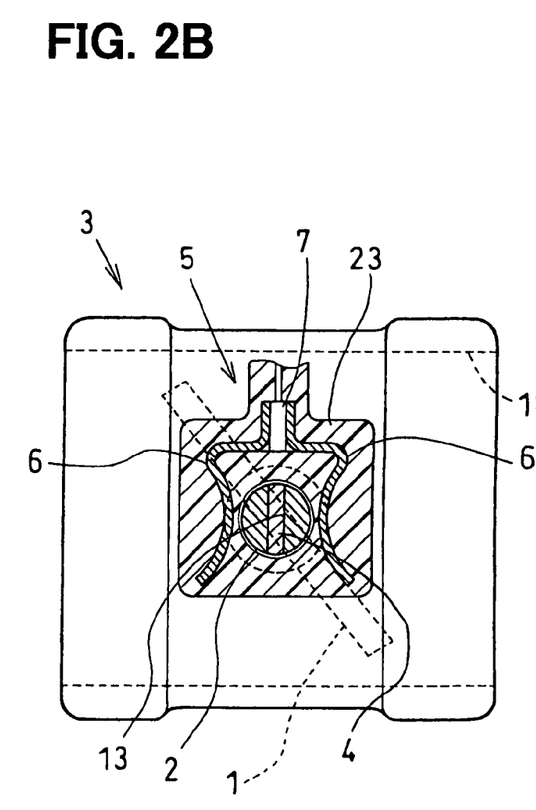
FIG. 2B is a cross-sectional view taken through line A—A of FIG. 2A.

FIGS. 1 through 6 show a first embodiment of the present invention where FIG. 1 is a view showing a throttle opening sensor and FIG. 2 is a view showing an inlet throttle device for internal combustion engine.

The inlet throttle device for internal combustion engine is a throttle device for an internal combustion engine, for controlling an engine revolution rate or an engine torque by changing the amount of intake air flowing into a combustion chamber of a cylinder of an internal combustion engine (for example, an engine for two-wheeled vehicle; hereinafter, referred to as an engine) based on the amount of operation of an accelerator by a driver (for example, the amount of operation of a throttle lever). The inlet throttle device for internal combustion engine includes a throttle valve 1 for controlling the amount of intake air sucked into the cylinder of an engine; a throttle shaft 2 cooperatively rotating with the throttle valve 1; a throttle body 3 through which the intake air toward a cylinder of the engine flows; and an engine control unit (hereinafter, referred to as an ECU; not shown) for controlling the amount of an injected fuel injected and supplied to the cylinder of the engine to an optimal value.

The throttle valve 1 is, as shown in FIGS. 2A and 2B, housed within the throttle body 3 so as to be openable and closable. The throttle valve 1 is a butterfly valve for regulating the amount of intake air sucked into the cylinder of the engine by changing a rotation angle from a full-close position with a minimum amount of intake air to a full-open position with a maximum amount of intake air, i.e., within the rotationally operable range. The throttle valve 1 is formed by a metal plate in an approximately disc-like shape, and is retained and fixed to an outer circumference of the throttle shaft 2 by a fastener (not shown) such as a fastening screw. The throttle valve 1 may be formed of a resin material by integral molding of a resin. In this case, a disc-like part and a cylindrical part in a diameter direction of the disc-like part are provided for the throttle valve 1 so that the throttle shaft 2 is fixed into the cylindrical part by insert molding or the like.

The throttle shaft 2 is made of a non-magnetic material, for example, a non-magnetic metal material in an approximately columnar shape, and has a valve retaining section 10 for retaining and fixing the throttle valve 1, as shown in FIG. 2A. One axial end side (on the right in the drawing) from the valve retaining section 10 serves as a first bearing sliding section slidably supported by an inner circumference of a first shaft bearing 11 of the throttle body 3. The other axial end side (on the left in the drawing) from the valve retaining section 10 serves as a second bearing sliding section slidably supported by an inner circumference of a second shaft bearing section 12 of the throttle body 3.

At a tip (one end) of the first bearing sliding section of the throttle shaft 2, as shown in FIGS. 2A and 2B, a groove 13 in an approximately straight line is formed on a vertical line approximately perpendicularly crossing a rotational center axis of the throttle shaft 2. A thin-plate magnet 4 having a rectangular parallelepiped shape is fixed into the groove 13 by using fixing means such as an adhesive. At a tip (the other end) of the second bearing sliding section of the throttle shaft 2, a minor diameter part 14 is formed. By caulking the minor diameter part 14, an accelerator lever 15 is fixed. On an outer circumference of the accelerator lever 15, an approximately V-shaped circumferential groove 16, in which opening-side and closure-side wire cables (not shown) working in cooperation with the throttle lever operated by the driver are wound, is provided. Moreover, on a right end face of the accelerator lever 15 in the drawing, a body-side hook (not shown) for locking a spring-side hook of a return spring 17 is integrally formed.

The throttle body 3 is a resin-molded article obtained by resin integral molding (resinification) with a non-magnetic material (for example, a resin material such as a thermoplastic resin) and is a device (a housing) for housing and retaining rotatably the throttle shaft 2 and the throttle valve 1 therein. As a resin material for resin integral molding of the throttle body 3, polybutylene terephthalate: PBT, polyphenylene sulfide: PPS, a polyamide resin: PA, polypropylene: PP or polyetherimide: PEI and the like may be used. A cylindrical tube-like bore wall 18 for forming an intake air passage therein is integrally formed with the throttle body 3 as shown in FIGS. 2A and 2B. Inside the bore wall 18, the throttle valve 1 is rotatably incorporated.

At the right end of the bore wall 18 in the drawing, a cylindrical first shaft bearing section 11 for rotatably supporting the first bearing sliding section of the throttle shaft 2 is integrally provided so as to protrude from an outer wall face of the bore wall 18 to the right in the drawing. At the left end of the bore wall 18 in the drawing, a cylindrical second shaft bearing section 12 for rotatably supporting the second bearing sliding section of the throttle shaft 2 is integrally provided so as to protrude from the outer wall face of the bore wall 18 to the left in the drawing. A right end of the first shaft bearing section 11, as shown in the drawing, is closed by an annular closure section 19 formed integrally with the first shaft bearing section 11. A left end of the second shaft bearing section 12 in the drawing is open. As a result, the opening of the second shaft bearing section 12 (a second shaft sliding hole 22) serves as a shaft insertion hole at the insertion of the throttle shaft 2 into the intake air passage.

First and second shaft sliding holes 21 and 22, each having a circular cross section, are formed in the first and second shaft bearing sections 11 and 12. The second shaft bearing section 12 functions as a cylindrical spring inner circumference guide to which the return spring 17 for biasing the throttle valve 1 in a return direction to the full-close position with the minimum amount of intake air is fitted. Moreover, on a left end face of the bore wall 18 in the drawing, a body-side hook section (not shown) for locking the spring-side hook section of the return spring 17 is integrally provided. The return spring 17 is a coil spring attached onto the outer circumferential side of the second bearing sliding section of the throttle shaft 2, that is, onto the outer circumferential side of the second shaft bearing section 12 of the throttle body 3. Its right end (one end) as shown in the drawing is retained by the body-side hook (not shown) provided on the outer wall face of the bore wall 18 of the throttle body 3, while its left end (the other end) as shown in the drawing is retained by the lever-side hook (not shown) provided on a side face of the bore wall of the accelerator lever 15.

Herein, the first shaft sliding hole 21 in this embodiment functions as a magnet holding hole for holding rotatably the thin-plate magnet 4 fixed to the right end of the throttle shaft 2 in the drawing so as to rotate with the rotation of the throttle valve 1. Moreover, a sensor retaining section 23 for retaining and fixing the throttle opening sensor 5 is integrally formed with the first shaft bearing section 11 in this embodiment. An approximately rectangular sensor insertion hole 24 for inserting the throttle opening sensor 5 into a predetermined part (in particular, the magnet detection gap 9) of the sensor retaining section 23 is formed in a part positioned lateral to the position where the throttle opening sensor 5 is attached (in particular, the position where the Hall IC 7 is attached). A right end of the sensor insertion hole 24 in the drawing is open. As a result, the opening of the sensor insertion hole 24 functions as a sensor insertion hole for inserting the Hall IC 7 into a predetermined part of the sensor retaining section 23 (in particular, the magnetic detection gap 9). The opening of the sensor insertion hole 24 is closed by assembling a cover plate (a sensor cover) 25 made of a resin material to an outer wall face of the sensor retaining section 24 by heat welding or the like after assembly of the Hall IC 7 to the predetermined part of the sensor retaining section 23. As a result, a foreign substance such as water can be prevented from entering the sensor retaining section 23.

Herein, the inlet throttle device for internal combustion engine in this embodiment includes a non-contact rotation angle detecting device for converting a rotation angle (a valve angle) of the throttle valve 1 into an electric signal (a throttle opening signal) so as to output the degree of opening of the throttle valve 1 to the engine control unit (ECU). The ECU in this embodiment is configured to perform injection amount control for controlling a valve-opening duration of an electromagnetic fuel injection valve (an injector: not shown) so that the amount of fuel injection corresponding to the throttle opening signal output from the rotation angle detecting device is injected and supplied to the cylinder of the engine. The rotation angle detecting device of this embodiment includes, as shown in FIGS. 1 through 6B, the thin-plate magnet 4 fixed to one end of the throttle shaft 2, the throttle opening sensor 5 forming the magnetic circuit with the thin-plate magnet 4 and the like. The throttle opening sensor 5 in this embodiment includes a pair of yokes (magnetic members) 6 magnetized by the thin-plate magnet 4, the Hall IC 7 provided in the magnetic detection gap 9 between the yokes 6 and the like.

The thin-plate magnet 4 is formed in a flat plate-like or a columnar shape; it rotates with the rotation of the throttle valve 1 corresponding to the object to be measured. At the same time, an N-pole and an S-pole are magnetized in parallel so that both ends in a plate-length direction approximately perpendicularly crossing a plate-thickness direction and a plate-width direction have opposed polarities to each other. The thin-plate magnet 4 has a square planar shape, and is a planar permanent magnet stably generating a magnetic force for a long period of time, for which, for example, a rare-earth magnet such as a samarium-cobalt (Sm—Co) magnet and a neodymium (Nd) magnet, an alnico magnet and a ferrite magnet is used. Both ends of the thin-plate like magnet 4 in the plate-length direction (a magnetization direction) are provided so as to face the respective inner circumferential faces of the pair of yokes 6 with an extremely small air gap therebetween. Herein, the reference numeral 20 indicates a magnet holding hole surrounded by the sensor retaining section 23 of the throttle body 3, in which the thin-plate magnet 4 is rotatable within the rotating operation range from the valve full-close position (the minimum angle) of the throttle valve 1 to the valve full-open position (the maximum angle).

Figure 3A:
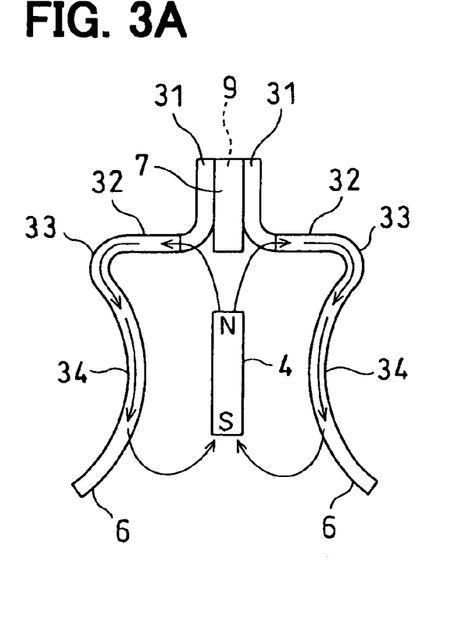
FIG. 3A is a front view of the throttle opening sensor of FIG. 1 showing a magnetic flux flow at a valve opening angle of 30° with the minimum output.
Figure 3B:
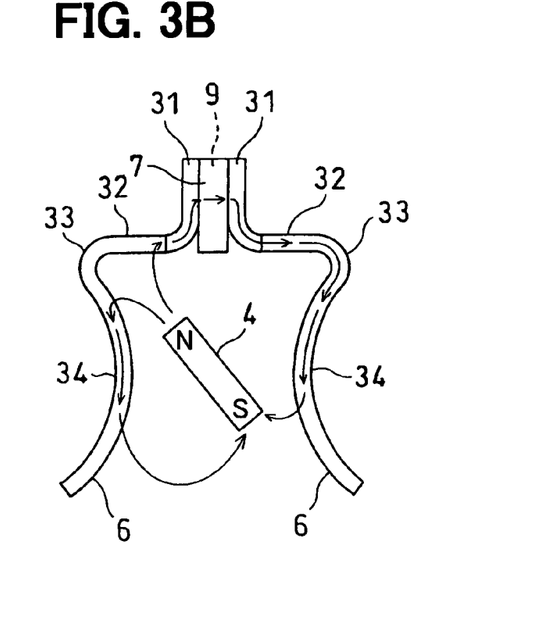
FIG. 3B is a front view of the throttle opening sensor of FIG. 1 showing a magnetic flux flow with a middle output.

Since the divided-type yokes 6 in a non-cylindrical shape are used in this embodiment, as described above, the amount of air gap formed between both ends of the thin-plate magnet 4 in the magnetization direction and the respective inner circumferential faces of the pair of yokes 6 has a variable value in accordance with a variation in rotation angles of the throttle valve 1 and the thin-plate magnet 4. As a result, magnetic flux generated from one end (the N-pole) of the thin-plate magnet 4 in the longitudinal direction returns to the other end (the S-pole) of the thin-plate magnet 4 through the pair of yokes 6, as indicated with an arrow in FIG. 3.

The pair of yokes 6 are made of a magnetic material such as iron, and form a predetermined air gap with both ends of the thin-plate magnet 4 in the magnetization direction. The pair of yokes 6 are divided into two or more parts so that they provide plane symmetry with respect to a vertical plane approximately perpendicularly crossing the rotational center axis of the thin-plate magnet 4. The Hall IC 7 is provided in the magnetic detection gap 9 having certain size formed by the division. Each of the yokes 6 includes an approximately circular curved part (reverse warp part) 34 arranged around the magnet 4 so as to concentrate the magnetic flux of the magnet 4 thereon; a magnetic detection element retaining piece (hereinafter, abbreviated as a retaining piece) 31 having a smaller width than that of the curved part 34 on one side of the curved part 34; a shoulder part 32 connected to an end of the retaining piece 31; and a bent part (winding part) 33 bent at an end of the shoulder part 32 at an approximately acute angle so as to be connected to the curved part 34.

The retaining pieces 31 are rising walls (opposed walls) provided so as to be opposed to each other through the magnetic detection gap 9 while being in contact with both magnetically sensitive faces of the Hall IC 7. Bent parts 35, which are bent so as to be far away from each other to be connected to the opposed-side ends of the respective shoulder parts 32, are provided at the ends of the retaining pieces 31. Specifically, each of the retaining pieces 31 is provided to be bent at the end of each of the shoulder parts 32 on the magnetic detection gap 9 side so as to be far away from the rotational center axis of the throttle shaft 2 and the thin-plate magnet 4. The pair of yokes 6 are formed by insert molding in the sensor retaining section 23 so that at least the opposed face of each of the retaining pieces 31 is exposed in the sensor insertion hole 24.

Each of the shoulder parts 32 is extended in a direction approximately perpendicularly crossing the center axis direction (a vertical direction) so as to be far away from each other in an approximately straight manner in a vertical direction (in a horizontal direction as illustrated in FIG. 3). Each of the bent parts 33 is provided at the position the furthest away from one end (the N-pole) of the thin-plate magnet 4 in the magnetization direction. The largest air gap is formed with one end (the N-pole) of the thin-plate magnet 4 in the magnetization direction.

Each of the reverse warp parts 34 is provided so that the air gap formed between both ends of the thin-plate magnet 4 in the magnetization direction and the inner faces of the pair of yokes 6 suddenly increases as the thin-plate magnet 4 rotates at a predetermined rotational angle from the air gap minimum state to the side where the air gap increases. Moreover, the reverse warp parts 34 are provided so as to be warped to be separated away from each other. A state where the air gap formed between both ends of the thin-plate magnet 4 in the magnetization direction and the inner faces of the pair of yokes 6 becomes minimum when the throttle valve 1 and the thin-plate magnet 4 are at the vicinity of the maximum angle (for example, 80°) is set as a reference position (at the position where a vertical line with respect to the rotational center axis of the thin-plate magnet 4 crosses). The reverse warp parts 34 are provided so that parts extended from the reference position to both sides (in the vertical direction in the drawing) are curved in an approximately circular manner.

The Hall IC 7 in this embodiment has the magnetically sensitive faces with a certain width on both sides of the Hall IC 7 in the plate-thickness direction, as shown in FIGS. 1 through 3. The Hall IC 7 is an IC (an integrated circuit) obtained by integrating a Hall element (a non-contact magnetic detection element) and an amplifier circuit, and outputs a voltage signal in accordance with a density of magnetic flux passing through the magnetic detection gap 9 (a density of magnetic flux crossing the Hall IC 7). The Hall IC 7 may have functions of output gain adjustment and offset adjustment for the density of the magnetic flux and of externally electrically trimming a correction program of a temperature characteristic and a self-diagnostic function of short-circuit.

The Hall IC 7 is inserted through the sensor insertion hole 24 so that the Hall IC 7 is fitted into the magnetic detection gap 9 formed between the retaining pieces 31 of the pair of yokes 6 retained and fixed (insert-molded) into the sensor retaining section 23 integrally formed with the outer wall face of the throttle body 3 of a resin, thereby assembling the Hall IC 7 at a predetermined position of the sensor retaining section 23. As a result, the Hall IC 7 is fitted into the magnetic detection gap 9 formed between the retaining pieces 31 of the pair of yokes 6 so as to be positioned. Lead wires of the Hall IC 7 (two output lead terminals and one power supply (electrical supply) terminal) are electrically and mechanically connected to connector pins (terminals: not shown) formed by insert molding into the sensor retaining section 23 by bonding means such as resistance welding.

The magnetic detection gap 9 is provided in the middle of a magnetic circuit including the thin-plate magnet 4 and the pair of yokes 6 so that a positional relation is such that the density of the magnetic flux crossing both magnetically sensitive faces of the Hall IC 7 becomes relatively large with respect to the magnetization direction of the thin-plate magnet 4 in a positional relation where the air gap between the thin-plate magnet 4 and the reverse warp parts 34 of the yokes 6 becomes minimum. Moreover, the magnet detection gap 9 is provided in the middle of the magnetic circuit so that a positional relation is such that the density of the magnetic flux crossing both magnetically sensitive faces of the Hall IC 7 becomes relatively small with respect to the magnetization direction of the thin-plate magnet 4 when the rotation angles of the throttle valve 1 and the thin-plate magnet 4 are situated in the vicinity of a middle angle (for example, 40°) between the minimum angle and the maximum angle.

Next, functions of the inlet throttle device for internal combustion engine including the rotation angle detecting device of this embodiment will be described based on FIGS. 1 through 6B.

When the throttle lever is operated by the driver, the accelerator lever 15 mechanically connected to the throttle lever through a wire cable rotates at a rotation angle in accordance with the amount of operation of the throttle lever against a biasing force of the return spring 17. Then, the rotation of the accelerator lever 15 described above is transmitted to the throttle shaft 2. With the rotation of the throttle shaft 2, the throttle valve 1 rotates at the same rotation angle as that of the accelerator lever 15, that is, the throttle shaft 2. As a result, since the intake air passage to the cylinder of the engine is opened at a predetermined degree of throttle opening, the engine revolution rate is changed in accordance with the amount of operation of the throttle lever.

Herein, when the rotation angle of the throttle valve 1 is in the vicinity of the middle angle (when the valve opening of the throttle valve 1 is at 30° in this embodiment and the rotation angle of the thin-plate magnet (magnet) 4 is 0° in this embodiment), as indicated with an arrow in FIG. 3A, the magnetic flux generated from one end (the N-pole) of the thin-plate magnet 4 in the plate-length direction passes through the respective shoulder parts 32 of the pair of yokes 6, the respective bent parts 33 of the pair of yokes 6 and the reverse warp parts 34 of the pair of yokes 6 to return to the other end (the S-pole) of the thin-plate magnet 4 in the plate-length direction. At this time, a positional relation is such that a density of the magnetic flux passing through the magnet detection gap 9 (a density of the magnetic flux crossing the Hall IC 7) becomes relatively small with respect to the magnetization direction of the thin-plate magnet 4. As a result, an output voltage output from the Hall IC 7 for the rotation angles of the throttle valve 1 and the thin-plate magnet 4 becomes almost 0, as shown in a graph of FIG. 5.

Figure 5:
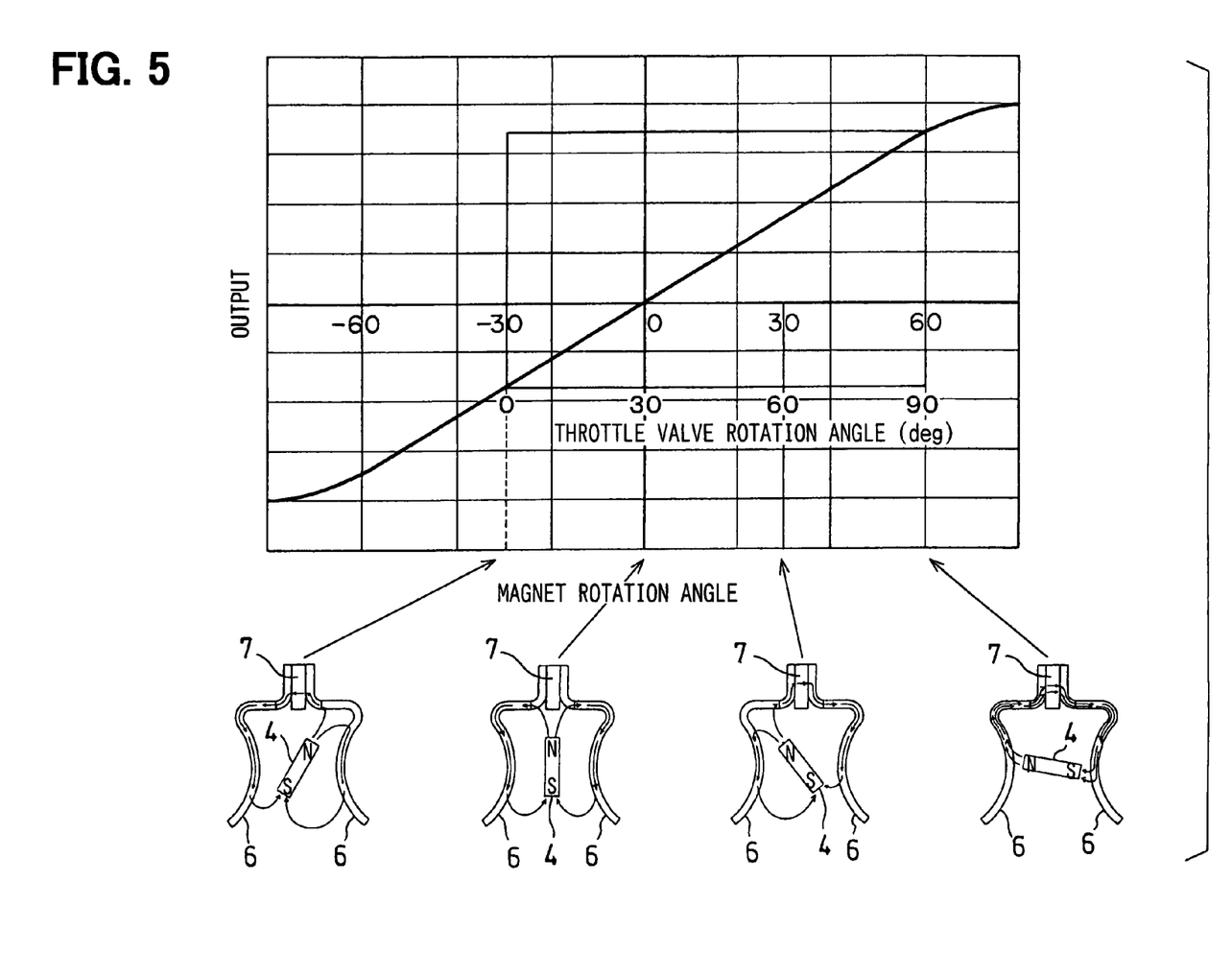
FIG. 5 is a graph showing an output characteristic of the throttle opening sensor of FIG. 1 with respect to a rotation angle of the throttle valve.

Moreover, when the rotation angle of the throttle valve 1 changes from the vicinity of the middle angle in the opening increasing direction (the full-opening direction) (when the valve opening of the throttle valve 1 is at 60° to 70° in this embodiment, and the rotation angle of the thin-plate magnet (magnet) 4 is 30° to 40° in this embodiment), as indicated with an arrow in FIG. 3B, the magnetic flux from one end (the N-pole) of the thin-plate magnet 4 in the plate-length direction returns to the other end (the S-pole) of the thin-plate magnet 4 in the plate-length direction through the reverse warp part 34 of the left yoke 6 in the drawing. Moreover, the magnetic flux from one end (the N-pole) of the thin-plate magnet 4 in the plate-length direction passes through the shoulder part 32 of the left yoke 6 in the drawing, the retaining piece 31 of the left yoke 6 in the drawing, the magnetic detection gap 9 (the Hall IC 7), the retaining piece 31 of the right yoke 6 in the drawing, the shoulder part 32 of the right yoke 6 in the drawing, the bent part 33 of the right yoke 6 in the drawing and the reverse warp part 34 of the right yoke 6 in the drawing to return to the other end (the S-pole) of the thin-plate magnet 4 in the plate-length direction. At this time, a positional relation is such that a density of the magnetic flux passing through the magnet detection gap 9 (a density of the magnetic flux crossing the Hall IC 7) becomes relatively moderate with respect to the magnetization direction of the thin-plate magnet 4. As a result, an output voltage output from the Hall IC 7 for the rotation angles of the throttle valve 1 and the thin-plate magnet 4 linearly increases in accordance with the amount of change as shown in the graph of FIG. 5.

Figure 4A:
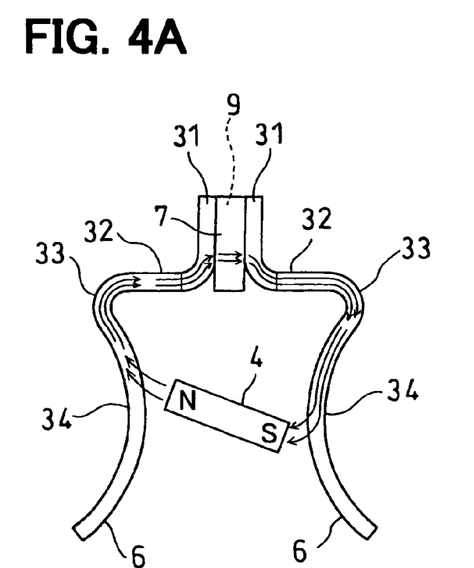
FIG. 4A is a front view of the throttle opening sensor of FIG. 1 showing a magnetic flux flow when the throttle valve is in a full-open state.

Then, when the rotation angle of the throttle valve 1 is further greatly changed from the vicinity of the middle angle to the opening increasing direction (in the full-open direction) (when the throttle valve 1 is at the full-open position, that is, the valve opening is at 90° in this embodiment, and the rotation angle of the thin-plate magnet (magnet) 4 is 60° in this embodiment), as indicated with an arrow in FIG. 4A, the magnetic flux from one end (the N-pole) of the thin-plate magnet 4 in the plate-length direction passes through the reverse warp part 34 of the left yoke 6 in the drawing, the bent part 33 of the left yoke 6 in the drawing, the shoulder part 32 of the left yoke 6 in the drawing, the retaining piece 31 of the left yoke 6 in the drawing, the magnetic detection gap 9 (the Hall IC 7), the retaining piece 31 of the right yoke 6 in the drawing, the shoulder part 32 of the right yoke 6 in the drawing, the bent part 33 of the right yoke 6 in the drawing and the reverse warp part 34 of the right yoke 6 in the drawing to return to the other end (the S-pole) of the thin-plate magnet 4 in the plate-length direction. At this time, a positional relation is such that a density of the magnetic flux passing through the magnet detection gap 9 (a density of the magnetic flux crossing the Hall IC 7) becomes relatively large with respect to the magnetization direction of the thin-plate magnet 4. As a result, an output voltage output from the Hall IC 7 for the rotation angles of the throttle valve 1 and the thin-plate magnet 4 has a maximum value in the linear area as shown in the graph of FIG. 5.

Figure 4B:
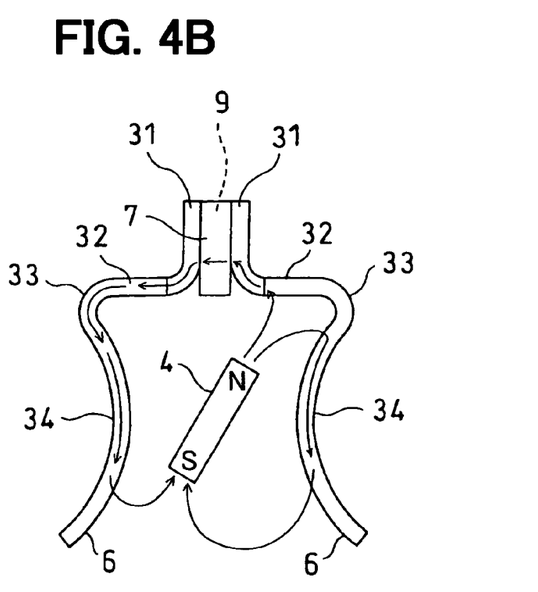
FIG. 4B is a front view of the throttle opening sensor of FIG. 1 showing a magnetic flux flow when the throttle valve is in a full-close state.

On the other hand, when the rotation angle of the throttle valve 1 is changed from the vicinity of the middle angle to the opening decreasing direction (in the full-close direction) (when the throttle valve 1 is at the full-close position, that is, the valve opening is at 0° in this embodiment, and the rotation angle of the thin-plate magnet (magnet) 4 is −30° in this embodiment), as indicated with an arrow in FIG. 4B, a magnetic flux flow is in a direction reverse to that of the FIG. 3B described above, that is, from the retaining piece 31 of the right yoke 6 in the drawing through the magnetic detection gap 9 (the Hall IC 7) to the retaining piece 31 of the left yoke 6 in the drawing. An output voltage output from the Hall IC 7 is a linear negative output in accordance with the amount of change as shown in the graph of FIG. 5.

As described above, in the rotation angle detecting device in this embodiment, the pair of yokes 6 includes the Hall IC 7 constituting a sensing section of the throttle opening sensor 5 provided in the magnetic detection gap 9 formed between the retaining pieces 31 provided so as to be opposed to each other. The yokes are divided so as to provide plane symmetry with respect to the vertical plane approximately perpendicularly crossing the rotational center axis of the thin-plate magnet 4. The reverse warp parts 34 curved so as to be respectively warped away from the reference position are provided for the pair of yokes 6. As a result, if the rotation angle of the throttle valve 1 rotates at a predetermined rotation angle from the vicinity of the maximum angle toward the minimum angle, the air gap formed between both ends of the thin-plate magnet 4 in the magnetization direction and the inner faces (the opposed faces) of the pair of yokes 6 suddenly increase. Therefore, the density of the magnetic flux passing through the magnetic detection gap 9 between the pair of yokes 6 (the density of the magnetic flux crossing the Hall IC 7) suddenly decreases.

As a result, since the output voltage from the Hall IC 7 also suddenly drops, it becomes closer to the ideal output voltage as compared with that in the conventional technique. Therefore, the linearity of the output voltage from the Hall IC 7 with respect to the rotation angles of the throttle valve 1 and the thin-plate magnet 4 (the linearity of the output variation characteristic of the Hall IC 7) over a full range of the detected angle of the throttle valve 1 can be improved. In particular, since the linearity of the output voltage from the Hall IC 7 (the linearity of the output variation characteristic of the Hall IC 7) with respect to the rotation angles of the object to be measured and the thin-plate magnet 4 when the rotation angle of the throttle valve 1 is in the vicinity of the maximum angle can be improved, the detection accuracy of the rotation angle of the throttle valve 1 can be improved.

Moreover, the retaining pieces 31, each having a smaller width than that of both magnetically sensitive faces of the Hall IC 7, are respectively provided for the pair of yokes 6. The respective retaining pieces 31 of the pair of yokes 6 are provided so as to be opposed to each other through the magnetic detection gap 9 while being in contact with both magnetically sensitive faces of the Hall IC 7. This can concentrate the magnetic flux on both the magnetically sensitive faces of the Hall IC 7. As a result, since the magnetic flux can be concentrated on both magnetically sensitive faces of the Hall IC 7 effectively over the range of a rotation angle in which the thin-plate magnet 4 rotates from the minimum angle to the maximum angle with the rotation of the throttle valve 1, that is, over a full range of the detected angle of the throttle valve 1, a stable output voltage can be obtained from the Hall IC 7.

Moreover, the sensor retaining sections 23 for retaining and fixing the throttle opening sensor 5 including the pair of yokes 6 and the Hall IC 7 and the first shaft sliding hole (the magnet holding hole) 21 for rotatably holding the thin-plate magnet 4 therein are provided on the right end of the bore wall 18 of the throttle body 3 as shown in the drawing. As a result, the housing for holding the thin-plate magnet 4 rotatably therein and the housing for holding the pair of yokes 6 and the Hall IC 7 can be constituted by a single component.

As a result, the positional accuracy (combination accuracy) of the pair of yokes 6 and the Hall IC 7 with respect to the magnetization direction of the thin-plate magnet 4 can be easily obtained, thereby reducing a variation in assembly of the thin-plate magnet 4 and the pair of yokes 6 and the Hall IC 7. Moreover, since a variation in output from the Hall IC 7 is unlikely to occur, the detection accuracy of the rotation angle of the thin-plate magnet 4 rotating with the rotation of the throttle valve 1 can be prevented from being lowered. Moreover, since the single thin-plate magnet 4 is provided as a magnetic field source, the number of components and the number of assembly steps can be reduced as compared with those of the conventional techniques requiring two magnets. As a result, the overall cost of the rotation angle detecting device can be reduced.

Figure 7:
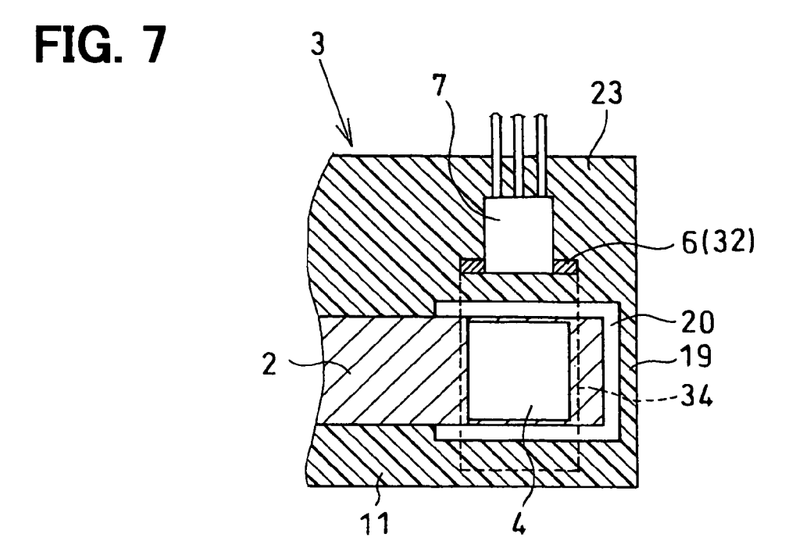
FIG. 7 is a cross-sectional view of an inlet throttle device for internal combustion engine according to a second embodiment of the present invention.

FIG. 7 shows a second embodiment of the present invention, illustrating an inlet throttle device for internal combustion engine.

In this embodiment, the Hall IC 7 and the lead wires of the Hall IC 7 (two output leading terminals and an electric supply terminal) are formed in the sensor retaining section 23 by insert molding with the pair of yokes 6. Since the cover plate (the sensor cover) 25 is not required in this case, the number of components and the number of assembly steps can be reduced as compared with those in the first embodiment described above. As a result, the overall cost of the rotation angle detection device can be further reduced.

In the embodiments, the accelerator lever 15 mechanically connected to the throttle lever through a wire cable is attached to one end of the throttle shaft 2 so that the rotation angle detecting device of the present invention is incorporated into the inlet throttle device for internal combustion engine, for transmitting the amount of operation of the accelerator by a driver to the throttle valve 1. However, the rotation angle detecting device of the present invention may be incorporated into a throttle control device for internal combustion engine, for transmitting rotational motive power of a driving motor (an actuator) through a motive power transmission device such as a gear reduction device to the throttle shaft 2 so as to control the rotation angle (the valve opening) of the throttle valve 1 in accordance with the amount of operation of the accelerator by the driver. In this case, a valve gear integrally formed with one end of the throttle shaft 2 is provided in place of the accelerator lever 15 attached to one end of the throttle shaft 2. In this manner, the amount of operation of the accelerator by the driver (for example, the amount of operation of the throttle lever or the amount of pressing on an accelerator pedal) can also be transmitted to the throttle valve 1.

In the embodiments, the example where the rotation angle detecting device of the present invention is applied to the rotation angle detection device (the throttle opening sensor, a throttle position sensor, or a rotation angle sensor) for converting the rotation angle (the valve opening) of the throttle valve 1 into an electric signal (a throttle opening signal) to output the degree of opening of the throttle valve 1 to the ECU has been described. However, the rotation angle detecting device of the present invention may be applied to a rotation angle detecting device (an accelerator opening sensor or a rotation angle sensor) for converting the amount of operation of the accelerator by the driver (for example, the rotation angle of the throttle lever or the rotation angle of the accelerator pedal) into an electric signal (an accelerator opening signal) so as to output the degree of operation of the throttle lever in a rotational direction or the degree of pressing of the accelerator pedal.

Moreover, as a resin material for resin integral molding of the throttle body 3, a resin composite material obtained by mixing a filler (for example, a glass fiber at low cost, a carbon fiber, an aramide fiber, a boron fiber or the like) or an additive with a resin material heated to a molten state (for example, a molten resin composed of a thermoplastic resin) (for example, polybutylene terephthalate containing a glass fiber at 30%: PBTG30, or polybutylene terephthalate containing a glass fiber at 40%: PBTG40) may also be used. Moreover, the above-described resin composite material may be injected into a cavity of a mold for resin molding from a gate so as to fabricate a resin throttle body by the injection molding of the resin composite material. The resin molded product obtained by resin integral molding through the injection molding of the resin composite material in this manner is provided at low cost and is excellent in resin moldability, and has improved performance including a mechanical property, strength, stiffness, heat resistance and the like. Furthermore, in the embodiments, although the resin material (for example, a molten resin composed of a thermoplastic resin) is used as a molten material heated to a molten state is used, a molten metal material (for example, a semi-molten alloy material such as an aluminum alloy) may also be used as a molten material heated to a molten state.

Although the pair of yokes 6 are formed in the sensor retaining section 23 of the throttle body (the housing) 3 by insert molding in the Examples, grooves corresponding to an outer shape of the pair of yokes 6 may be provided on an outer wall face of the sensor retaining section 23 of the throttle body 3 so that the pair of yokes 6 are pressed and fixed to the grooves. Furthermore, although the planar or columnar thin-plate magnet 4 is used as a magnet in the embodiments, a fine needle-like or fine bar-shaped magnet may also be used. In particular, the linearity of the output voltage from the Hall IC 7 (the linearity of the output variation characteristic of the Hall IC 7) with respect to the rotation angle of the thin-plate magnet 4 is improved as both ends in the plate-length direction, which are magnetized so as to have opposite polarities, become narrower. A resin magnet obtained by sintering polyamide resin (PA), Nd, Fe, and/or B powder may also be used as the thin-plate magnet 4.

In the embodiments, the example where the Hall IC 7 obtained by integrating the Hall element (a non-contact magnetic detection element) and the amplifier circuit is used as a non-contact magnetic detection element has been described. However, as the non-contact magnetic detection element, a Hall element may be solely used or a magneto-resistance element may be used. Moreover, although the example where the non-contact rotation angle sensor including the pair of yokes (magnetic members) 6 and the Hall IC 7 is used as the throttle opening sensor (the rotation angle sensor) has been described, a non-contact rotation angle sensor including a stator core (a magnetic member) and a magnetic detection element may also be used as the throttle opening sensor (the rotation angle sensor). Moreover, the magnet such as the planar or columnar thin-plate magnet 4 may be assembled to a rotor core connected to a rotating shaft such as the throttle shaft 2.

What is claimed is:

1. A rotation angle detecting device comprising:
    a magnet that rotates with a rotation of an object to be measured, the magnet including two ends magnetized so as to have opposite polarities;
    a magnetic substance unit forming a predetermined air gap with the two ends of the magnet, the magnetic substance unit being divided into magnetic members so as to provide plane symmetry with respect to a vertical plane perpendicularly crossing a rotational center axis of the magnet to form a magnetic detection gap by the division; and
    a non-contact magnetic detection element provided in the magnetic detection gap between the magnetic members so as to output a signal corresponding to a density of a magnetic flux passing through the magnetic detection gap,
    wherein a rotation angle of the object to be measured is detected based on the output signal from the magnetic detection element, and
    the magnetic members each include a reverse warp part so that the air gap suddenly increases when the magnet rotates at a predetermined rotation angle from a state where the air gap is minimum in a direction in which the air gap increases.

2. The rotation angle detecting device according to claim 1, wherein
    the reverse warp parts are provided so that parts extended from reference positions to both sides are curved in an approximately circular arc shape, the reference positions being positions with the minimum air gap.

3. The rotation angle detecting device according to claim 1, further comprising:
    a housing integrally formed of a non-magnetic material and including a sensor retaining section and a magnet holding hole,
    the sensor retaining section for retaining a rotation angle sensor including the magnetic members and the magnetic detection element, and
    the magnet holding hole for holding the magnet therein such that the magnet (4) can rotate freely.

4. The rotation angle detecting device according to claim 1, wherein
    the magnetic detection element has magnetically sensitive faces having a certain width on opposing sides in a plate-thickness direction, and
    the magnetic detection gap is provided in the middle of the magnetic circuit including the magnet and the magnetic members so that a positional relation is such that a density of a magnetic flux crossing both the magnetically sensitive faces of the magnetic detection element in the plate-thickness direction with respect to a magnetization direction of the magnet becomes relatively small when the rotation angle of the object to be measured is positioned in the vicinity of the middle angle within the range of use.

5. The rotation angle detecting device according to claim 1, wherein
    the magnetic detection element has magnetically sensitive faces having a certain width on opposing sides in a plate-thickness direction,
    the magnetic members have magnetic detection element retaining pieces having a smaller plate width than that of the reverse warp parts, respectively, and
    the respective magnetic detection element retaining pieces of the magnetic members are provided so as to be opposed to each other through the magnetic detection gap while being in contact with both the magnetically sensitive faces of the magnetic detection element in the plate-thickness direction.

6. The rotation angle detecting device according to claim 5, wherein
    the magnetic members each have: a shoulder part extended in a direction approximately perpendicularly crossing a center axis direction so as to be separated away from each other in an approximately straight manner; and a bent part bent at an approximately acute angle at an end of the shoulder part so as to be connected to the reverse warp part, and
    the respective magnetic detection element retaining pieces of the magnetic members are provided so as to be bent at an approximately right angle at ends of the shoulder parts on the magnetic detection gap side so as to be separated away from the magnet.

* * * * *

UNITED STATES PATENT AND TRADEMARK OFFICE
CERTIFICATE OF CORRECTION

PATENT NO. : 7,078,893 B2  Page 1 of 1
APPLICATION NO. : 11/289647
DATED : July 18, 2006
INVENTOR(S) : Nakano et al.

It is certified that error appears in the above-identified patent and that said Letters Patent is hereby corrected as shown below:

Patent Cover Sheet, Item (56) References Cited, under the heading: U.S. PATENT DOCUMENTS, add -- 6,476,600 B2    11/2002    KONO et al. --.

Signed and Sealed this

Twelfth Day of December, 2006

JON W. DUDAS
*Director of the United States Patent and Trademark Office*